(12) United States Patent
Neal et al.

(10) Patent No.: US 7,165,110 B2
(45) Date of Patent: Jan. 16, 2007

(54) SYSTEM AND METHOD FOR SIMULTANEOUSLY ESTABLISHING MULTIPLE CONNECTIONS

(75) Inventors: Danny Marvin Neal, Round Rock, TX (US); Gregory Francis Pfister, Austin, TX (US); Renato John Recio, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 836 days.

(21) Appl. No.: 09/903,725

(22) Filed: Jul. 12, 2001

(65) Prior Publication Data

US 2003/0018787 A1    Jan. 23, 2003

(51) Int. Cl.
 G06F 15/16   (2006.01)
 G06F 11/30   (2006.01)
 G06F 12/14   (2006.01)
 H04L 9/32    (2006.01)
 H04L 9/00    (2006.01)

(52) U.S. Cl. .................. 709/227; 709/229; 709/226; 709/203; 370/524; 370/252; 370/241; 710/36; 710/235; 710/200

(58) Field of Classification Search ........ 709/225–230, 709/238, 240, 246, 249, 235; 710/5, 20, 710/29, 36, 558, 30; 370/230, 235, 394, 370/524, 252, 241; 719/314; 717/103; 718/101
See application file for complete search history.

(56) References Cited

U.S. PATENT DOCUMENTS

| | | | | |
|---|---|---|---|---|
| 5,537,417 A | * | 7/1996 | Sharma et al. ............ | 709/228 |
| 6,101,543 A | * | 8/2000 | Alden et al. .............. | 709/229 |
| 6,118,796 A | * | 9/2000 | Best et al. ................ | 370/524 |
| 6,240,457 B1 | * | 5/2001 | Bell ........................... | 709/230 |
| 6,247,060 B1 | * | 6/2001 | Boucher et al. ........... | 709/238 |
| 6,377,570 B1 | * | 4/2002 | Vaziri et al. .............. | 370/352 |
| 6,507,867 B1 | * | 1/2003 | Holland et al. ........... | 709/219 |
| 6,611,872 B1 | * | 8/2003 | McCanne .................. | 709/238 |
| 6,629,166 B1 | * | 9/2003 | Grun ......................... | 710/36 |
| 6,715,145 B1 | * | 3/2004 | Bowman-Amuah ....... | 718/101 |
| 6,744,765 B1 | * | 6/2004 | Dearth et al. ............. | 370/394 |
| 6,950,885 B1 | * | 9/2005 | Shah ......................... | 710/36 |

* cited by examiner

*Primary Examiner*—David Wiley
*Assistant Examiner*—Jude J. Jean-Gilles
(74) *Attorney, Agent, or Firm*—Duke W. Yee; Thomas E. Tyson; Betty Formby (57) ABSTRACT

A system and method for establishing multiple connections using a private data field of a communication management protocol is provided. With the present invention, a Service ID identifies a specific consumer and the private data field contains a list of connection attributes for each connection that is to be established. An active side requests a connection and the passive side replies to the connection request. The active side sends the passive side a connection establishment request. This connection establishment request includes a Service ID which identifies a passive side process associated with a service. This connection establishment request also includes communication attributes of one or more connected services and datagram services associated with the Service ID. The passive passes the connection request to a process associated with the service. If the passive side process does not wish to carry out the service, a negative reply message is returned to the active side. If the passive side process does wish to carry out the service, a positive reply is returned to the active side and the reply includes the communication attributes for the connection and unreliable services associated with the Service ID used in the connection establishment request.

22 Claims, 8 Drawing Sheets

SYSTEM AND METHOD FOR SIMULTANEOUSLY ESTABLISHING MULTIPLE CONNECTIONS

BACKGROUND OF THE INVENTION

1. Technical Field

The present invention generally relates to communications between computer systems. More specifically, the present invention provides a method of how more than one particular application process is identified during a communication establishment.

2. Description of Related Art

In a System Area Network (SAN), the hardware provides a message passing mechanism that can be used for Input/Output devices (I/O) and interprocess communications between general computing nodes (IPC). Processes executing on devices access SAN message passing hardware by posting send/receive messages to send/receive work queues on a SAN channel adapter (CA). These processes also are referred to as "consumers".

The send/receive work queues (WQ) are assigned to a consumer as a queue pair (QP). The messages can be sent over five different transport types: Reliable Connected (RC), Reliable datagram (RD), Unreliable Connected (UC), Unreliable Datagram (UD), and Raw Datagram (RawD). Consumers retrieve the results of these messages from a completion queue (CQ) through SAN send and receive work completion (WC) queues. The source channel adapter takes care of segmenting outbound messages and sending them to the destination. The destination channel adapter takes care of reassembling inbound messages and placing them in the memory space designated by the destination's consumer.

Two channel adapter types are present in nodes of the SAN fabric, a host channel adapter (HCA) and a target channel adapter (TCA). The host channel adapter is used by general purpose computing nodes to access the SAN fabric. Consumers use SAN verbs to access host channel adapter functions. The software that interprets verbs and directly accesses the channel adapter is known as the channel interface (CI).

Target channel adapters (TCA) are used by nodes that are the subject of messages sent from host channel adapters. The target channel adapters serve a similar function as that of the host channel adapters in providing the target node an access point to the SAN fabric.

At present, if multiple connections need to be established, a connection establishment protocol must be performed for each connection. A mechanism is needed to establish an arbitrarily large number of connections. The mechanism must use a communication management redirection to redirect connection establishment to a queue pair which can handle a larger Maximum Transfer Unit. The mechanism must allow a protocol to exchange parameters for multiple connections as private data.

SUMMARY OF THE INVENTION

The present invention provides a system and method for establishing multiple connections using a private data field of a communication management protocol. With the present invention, a Service ID identifies a specific consumer and the private data field contains a list of connection attributes for each connection that is to be established. The active side requests a connection and the passive side replies to the connection request. The active side sends the passive side a connection establishment request. This connection establishment request includes a Service ID which identifies a passive side process associated with the service. This connection establishment request also includes communication attributes of one or more connected services and datagram services associated with the Service ID. The passive side passes the connection request to a process associated with the service. If the passive side process does not wish to carry out the service, a negative reply message is returned to the active side. If the passive side process does wish to carry out the service, a positive reply is returned to the active side and the reply includes the communication attributes for the connection and unreliable services associated with the Service ID used in the connection establishment request.

With the present invention, the time required to establish multiple connections and unreliable datagram resolutions is minimized. One communication establishment handshake can establish more than one connection and/or unreliable service resolution. Under heavy utilization, multiple connection resources needed between two processes can be allocated with one communication establishment handshake. Risks of not having the resources available if multiple communication establishment requests were used are eliminated.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention provides a distributed computing system having end nodes, switches, routers, and links interconnecting these components. Each end node uses send and receive queue pairs to transmit and receive messages. The end nodes segment the message into packets and transmit the packets over the links. The switches and routers interconnect the end nodes and route the packets to the appropriate end node. The end nodes reassemble the packets into a message at the destination.

Figure 1:
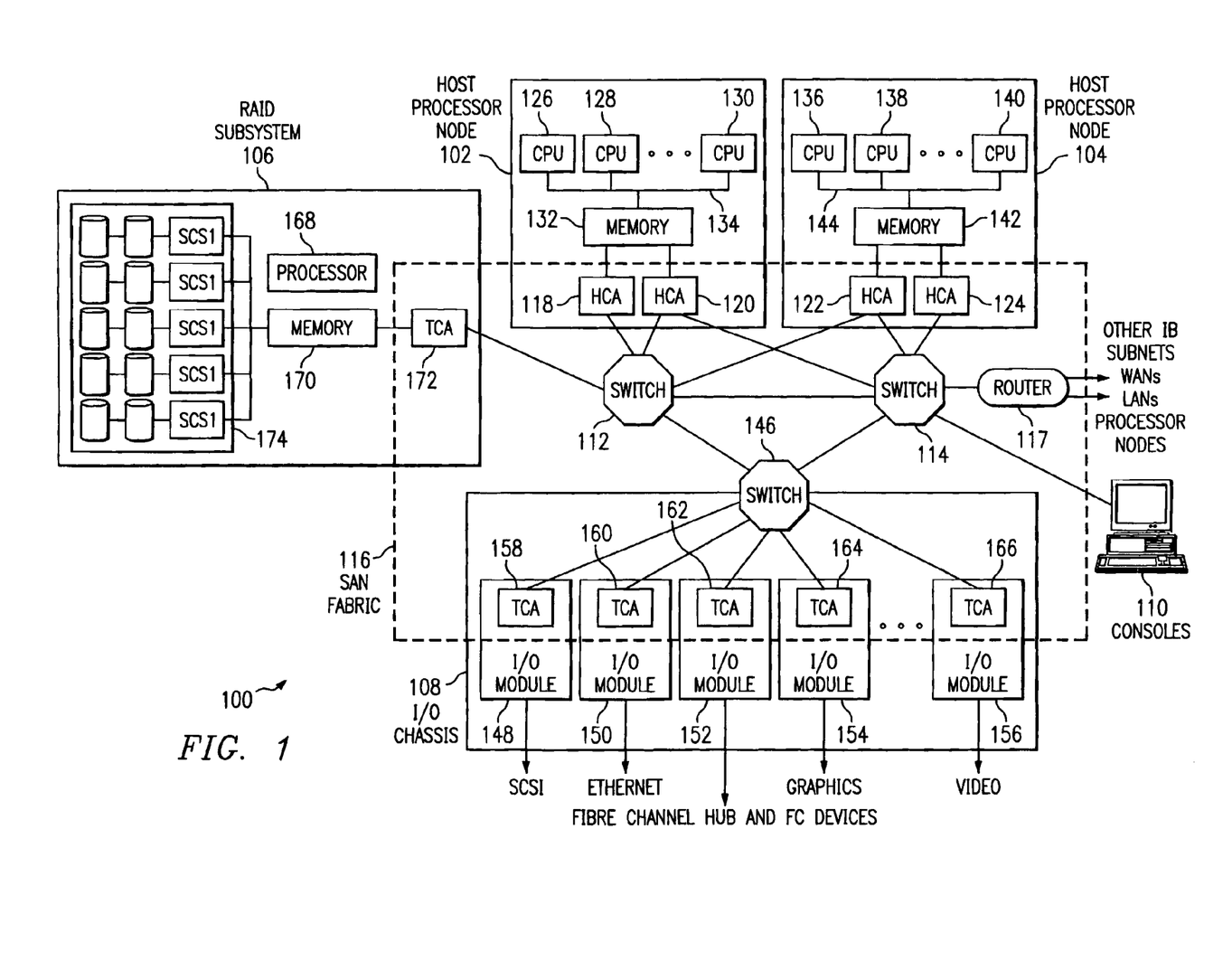
FIG. 1 is a diagram of a distributed computer system is illustrated in accordance with a preferred embodiment of the present invention.

With reference now to the figures and in particular with reference to FIG. 1, a diagram of a distributed computer system is illustrated in accordance with a preferred embodiment of the present invention. The distributed computer system represented in FIG. 1 takes the form of a system area network (SAN) 100 and is provided merely for illustrative purposes, and the embodiments of the present invention described below can be implemented on computer systems of numerous other types and configurations. For example, computer systems implementing the present invention can range from a small server with one processor and a few input/output (I/O) adapters to massively parallel supercomputer systems with hundreds or thousands of processors and thousands of I/O adapters. Furthermore, the present invention can be implemented in an infrastructure of remote computer systems connected by an Internet or intranet.

SAN 100 is a high-bandwidth, low-latency network interconnecting nodes within the distributed computer system. A node is any component attached to one or more links of a network and forming the origin and/or destination of messages within the network. In the depicted example, SAN 100 includes nodes in the form of host processor node 102, host processor node 104, redundant array independent disk (RAID) subsystem node 106, and I/O chassis node 108. The nodes illustrated in FIG. 1 are for illustrative purposes only, as SAN 100 can connect any number and any type of independent processor nodes, I/O adapter nodes, and I/O device nodes. Any one of the nodes can function as an endnode, which is herein defined to be a device that originates or finally consumes messages or packets in SAN 100.

In one embodiment of the present invention, an error handling mechanism in distributed computer systems is present in which the error handling mechanism allows for reliable connection or reliable datagram communication between end nodes in a distributed computing system, such as SAN 100.

A message, as used herein, is an application-defined unit of data exchange, which is a primitive unit of communication between cooperating processes. A packet is one unit of data encapsulated by networking protocol headers and/or trailers. The headers generally provide control and routing information for directing the packet through SAN 100. The trailer generally contains control and cyclic redundancy check (CRC) data for ensuring packets are not delivered with corrupted contents.

SAN 100 contains the communications and management infrastructure supporting both I/O and interprocessor communications (IPC) within a distributed computer system. The SAN 100 shown in FIG. 1 includes a switched communications fabric 116, which allows many devices to concurrently transfer data with high-bandwidth and low latency in a secure, remotely managed environment. Endnodes can communicate over multiple ports and utilize multiple paths through the SAN fabric. The multiple ports and paths through the SAN shown in FIG. 1 can be employed for fault tolerance and increased bandwidth data transfers.

The SAN 100 in FIG. 1 includes switch 112, switch 114, switch 146, and router 117. A switch is a device that connects multiple links together and allows routing of packets from one link to another link within a subnet using a small header Destination Local Identifier (DLID) field. A router is a device that connects multiple subnets together and is capable of routing frames from one link in a first subnet to another link in a second subnet using a large header Destination Globally Unique Identifier (DGUID).

In one embodiment, a link is a full duplex channel between any two network fabric elements, such as endnodes, switches, or routers. Example suitable links include, but are not limited to, copper cables, optical cables, and printed circuit copper traces on backplanes and printed circuit boards.

For reliable service types, endnodes, such as host processor endnodes and I/O adapter endnodes, generate request packets and return acknowledgment packets. Switches and routers pass packets along, from the source to the destination. Except for the variant CRC trailer field, which is updated at each stage in the network, switches pass the packets along unmodified. Routers update the variant CRC trailer field and modify other fields in the header as the packet is routed.

In SAN 100 as illustrated in FIG. 1, host processor node 102, host processor node 104, and I/O chassis 108 include at least one channel adapter (CA) to interface to SAN 100. In one embodiment, each channel adapter is an endpoint that implements the channel adapter interface in sufficient detail to source or sink packets transmitted on SAN fabric 100. Host processor node 102 contains channel adapters in the form of host channel adapter 118 and host channel adapter 120. Host processor node 104 contains host channel adapter 122 and host channel adapter 124. Host processor node 102 also includes central processing units 126–130 and a memory 132 interconnected by bus system 134. Host processor node 104 similarly includes central processing units 136–140 and a memory 142 interconnected by a bus system 144.

Host channel adapters 118 and 120 provide a connection to switch 112 while host channel adapters 122 and 124 provide a connection to switches 112 and 114.

In one embodiment, a host channel adapter is implemented in hardware. In this implementation, the host channel adapter hardware offloads much of central processing unit and I/O adapter communication overhead. This hardware implementation of the host channel adapter also permits multiple concurrent communications over a switched network without the traditional overhead associated with communicating protocols. In one embodiment, the host channel adapters and SAN 100 in FIG. 1 provide the I/O and interprocessor communications (IPC) consumers of the distributed computer system with zero processor-copy data transfers without involving the operating system kernel process, and employs hardware to provide reliable, fault tolerant communications.

As indicated in FIG. 1, router 117 is coupled to wide area network (WAN) and/or local area network (LAN) connections to other hosts or other routers.

The I/O chassis 108 in FIG. 1 includes an I/O switch 146 and multiple I/O modules 148–156. In these examples, the I/O modules take the form of adapter cards. Example adapter cards illustrated in FIG. 1 include a SCSI adapter card for I/O module 148; an adapter card to fiber channel hub and fiber channel-arbitrated loop (FC-AL) devices for I/O module 152; an ethernet adapter card for I/O module 150; a graphics adapter card for I/O module 154; and a video adapter card for I/O module 156. Any known type of adapter card can be implemented. I/O adapters also include a switch in the I/O adapter backplane to couple the adapter cards to the SAN fabric. These modules contain target channel adapters 158–166.

In this example, RAID subsystem node 106 in FIG. 1 includes a processor 168, a memory 170, a target channel adapter (TCA) 172, and multiple redundant and/or striped storage disk unit 174. Target channel adapter 172 can be a fully functional host channel adapter.

SAN 100 handles data communications for I/O and interprocessor communications. SAN 100 supports high-bandwidth and scalability required for I/O and also supports the extremely low latency and low CPU overhead required for interprocessor communications. User clients can bypass the operating system kernel process and directly access network communication hardware, such as host channel adapters, which enable efficient message passing protocols. SAN 100 is suited to current computing models and is a building block for new forms of I/O and computer cluster communication. Further, SAN 100 in FIG. 1 allows I/O adapter nodes to communicate among themselves or communicate with any or all of the processor nodes in a distributed computer system. With an I/O adapter attached to the SAN 100, the resulting I/O adapter node has substantially the same communication capability as any host processor node in SAN 100.

In one embodiment, the SAN 100 shown in FIG. 1 supports channel semantics and memory semantics. Channel semantics is sometimes referred to as send/receive or push communication operations. Channel semantics are the type of communications employed in a traditional I/O channel where a source device pushes data and a destination device determines a final destination of the data. In channel semantics, the packet transmitted from a source process specifies a destination processes' communication port, but does not specify where in the destination processes' memory space the packet will be written. Thus, in channel semantics, the destination process pre-allocates where to place the transmitted data.

In memory semantics, a source process directly reads or writes the virtual address space of a remote node destination process. The remote destination process need only communicate the location of a buffer for data, and does not need to be involved in the transfer of any data. Thus, in memory semantics, a source process sends a data packet containing the destination buffer memory address of the destination process. In memory semantics, the destination process previously grants permission for the source process to access its memory.

Channel semantics and memory semantics are typically both necessary for I/O and interprocessor communications. A typical I/O operation employs a combination of channel and memory semantics. In an illustrative example I/O operation of the distributed computer system shown in FIG. 1, a host processor node, such as host processor node 102, initiates an I/O operation by using channel semantics to send a disk write command to a disk I/O adapter, such as RAID subsystem target channel adapter (TCA) 172. The disk I/O adapter examines the command and uses memory semantics to read the data buffer directly from the memory space of the host processor node. After the data buffer is read, the disk I/O adapter employs channel semantics to push an I/O completion message back to the host processor node.

In one exemplary embodiment, the distributed computer system shown in FIG. 1 performs operations that employ virtual addresses and virtual memory protection mechanisms to ensure correct and proper access to all memory. Applications running in such a distributed computer system are not required to use physical addressing for any operations.

Figure 2:
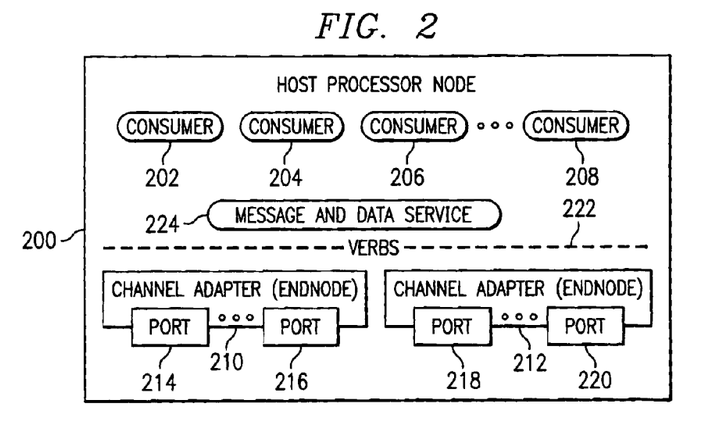
FIG. 2 is a functional block diagram of a host processor node in accordance with a preferred embodiment of the present invention.

FIG. 2 is a functional block diagram of a host processor node in accordance with a preferred embodiment of the present invention. Host processor node 200 is an example of a host processor node, such as host processor node 102 in FIG. 1. In this example, host processor node 200 shown in FIG. 2 includes a set of consumers 202–208, which are processes executing on host processor node 200. Host processor node 200 also includes channel adapter 210 and channel adapter 212. Channel adapter 210 contains ports 214 and 216 while channel adapter 212 contains ports 218 and 220. Each port connects to a link. The ports can connect to one SAN subnet or multiple SAN subnets, such as SAN 100 in FIG. 1. In these examples, the channel adapters take the form of host channel adapters.

Consumers 202–208 transfer messages to the SAN via the verbs interface 222 and message and data service 224. A verbs interface is essentially an abstract description of the functionality of a host channel adapter. An operating system may expose some or all of the verb functionality through its programming interface. Basically, this interface defines the behavior of the host. Additionally, host processor node 200 includes a message and data service 224, which is a higher-level interface than the verb layer and is used to process messages and data received through channel adapter 210 and channel adapter 212. Message and data service 224 provides an interface to consumers 202–208 to process messages and other data.

Figure 3A:
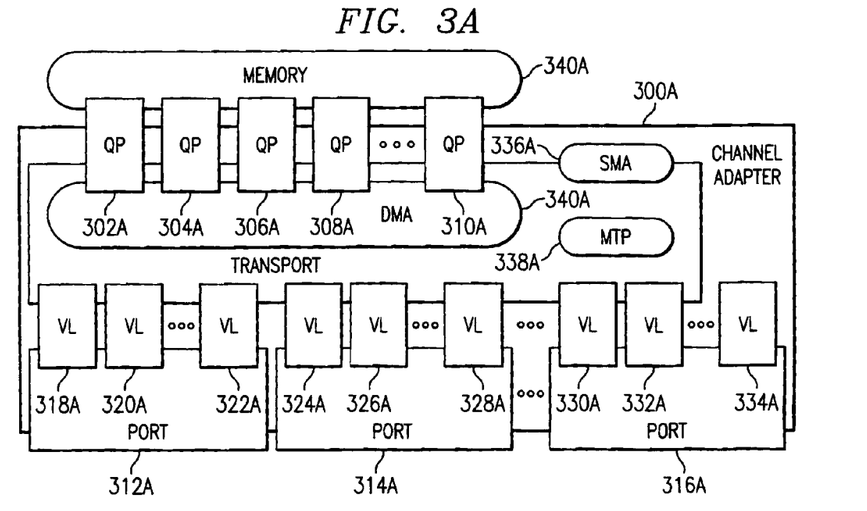
FIG. 3A is a diagram of a host channel adapter in accordance with a preferred embodiment of the present invention.

FIG. 3A is a diagram of a host channel adapter in accordance with a preferred embodiment of the present invention. Host channel adapter 300A shown in FIG. 3A includes a set of queue pairs (QPs) 302A–310A, which are used to transfer messages to the host channel adapter ports 312A–316A. Buffering of data to host channel adapter ports 312A–316A is channeled through virtual lanes (VL) 318A–334A where each VL has its own flow control. Subnet manager configures channel adapters with the local addresses for each physical port, i.e., the port's LID. Subnet manager agent (SMA) 336A is the entity that communicates with the subnet manager for the purpose of configuring the channel adapter. Memory translation and protection (MTP) 338A is a mechanism that translates virtual addresses to physical addresses and validates access rights. Direct memory access (DMA) 340A provides for direct memory access operations using memory 342A with respect to queue pairs 302A–310A.

A single channel adapter, such as the host channel adapter 300A shown in FIG. 3A, can support thousands of queue pairs. By contrast, a target channel adapter in an adapter typically supports a much smaller number of queue pairs. Each queue pair consists of a send work queue (SWQ) and a receive work queue. The send work queue is used to send channel and memory semantic messages. The receive work queue receives channel semantic messages. A consumer calls an operating-system specific programming interface, which is herein referred to as verbs, to place work requests (WRs) onto a work queue.

Figure 3B:
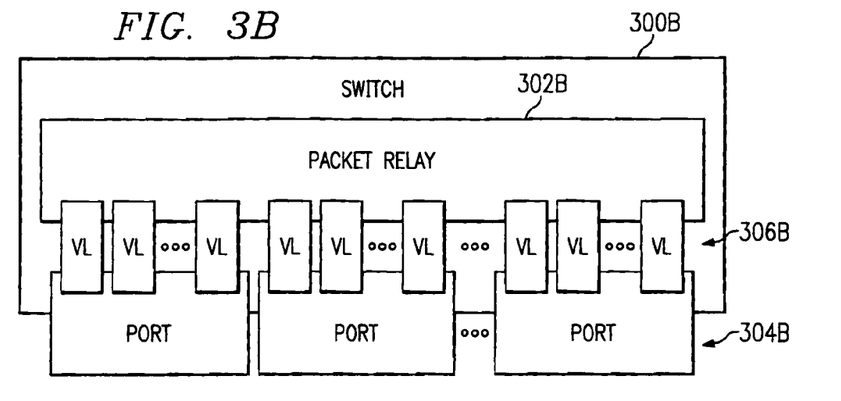
FIG. 3B is a diagram of a switch in accordance with a preferred embodiment of the present invention.

FIG. 3B is a diagram of a switch in accordance with a preferred embodiment of the present invention. Switch 300B includes a packet relay 302B in communication with a number of ports 304B through virtual lanes such as virtual lane 306B. Generally, a switch such as switch 300B can route packets from one port to any other port on the same switch.

Figure 3C:
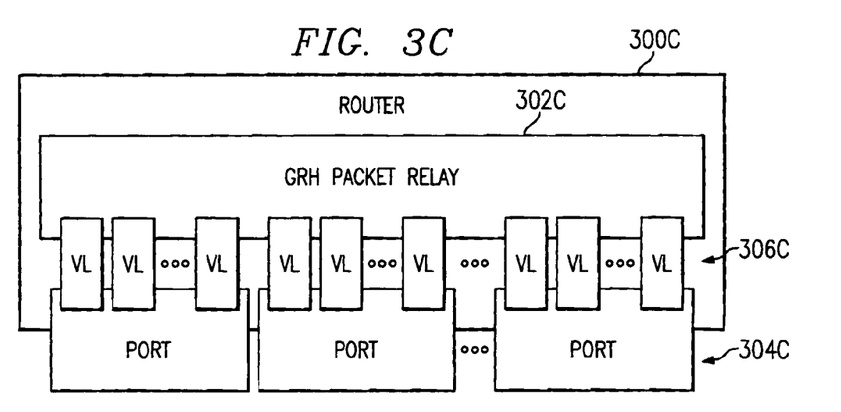
FIG. 3C is a diagram of a router in accordance with a preferred embodiment of the present invention.

FIG. 3C is a diagram of a router in accordance with a preferred embodiment of the present invention. Router 300C includes a packet relay 302C in communication with a number of ports 304C through virtual lanes such as virtual lane 306C. Like switch 300B, router 300C will generally be able to route packets from one port to any other port on the same router.

Channel adapters, switches, and routers employ multiple virtual lanes within a single physical link. As illustrated in FIGS. 3A, 3B, and 3C, physical ports connect endnodes, switches, and routers to a subnet. Packets injected into the SAN fabric follow one or more virtual lanes from the packet's source to the packet's destination. The virtual lane that is selected is mapped from a service level associated with the packet. At any one time, only one virtual lane makes progress on a given physical link. Virtual lanes provide a technique for applying link level flow control to one virtual lane without affecting the other virtual lanes. When a packet on one virtual lane blocks due to contention, quality of service (QoS), or other considerations, a packet on a different virtual lane is allowed to make progress.

Virtual lanes are employed for numerous reasons, some of which are as follows: Virtual lanes provide QoS. In one example embodiment, certain virtual lanes are reserved for high priority or isochronous traffic to provide QoS.

Virtual lanes provide deadlock avoidance. Virtual lanes allow topologies that contain loops to send packets across all physical links and still be assured the loops won't cause back pressure dependencies that might result in deadlock.

Virtual lanes alleviate head-of-line blocking. When a switch has no more credits available for packets that utilize a given virtual lane, packets utilizing a different virtual lane that has sufficient credits are allowed to make forward progress.

Figure 4:
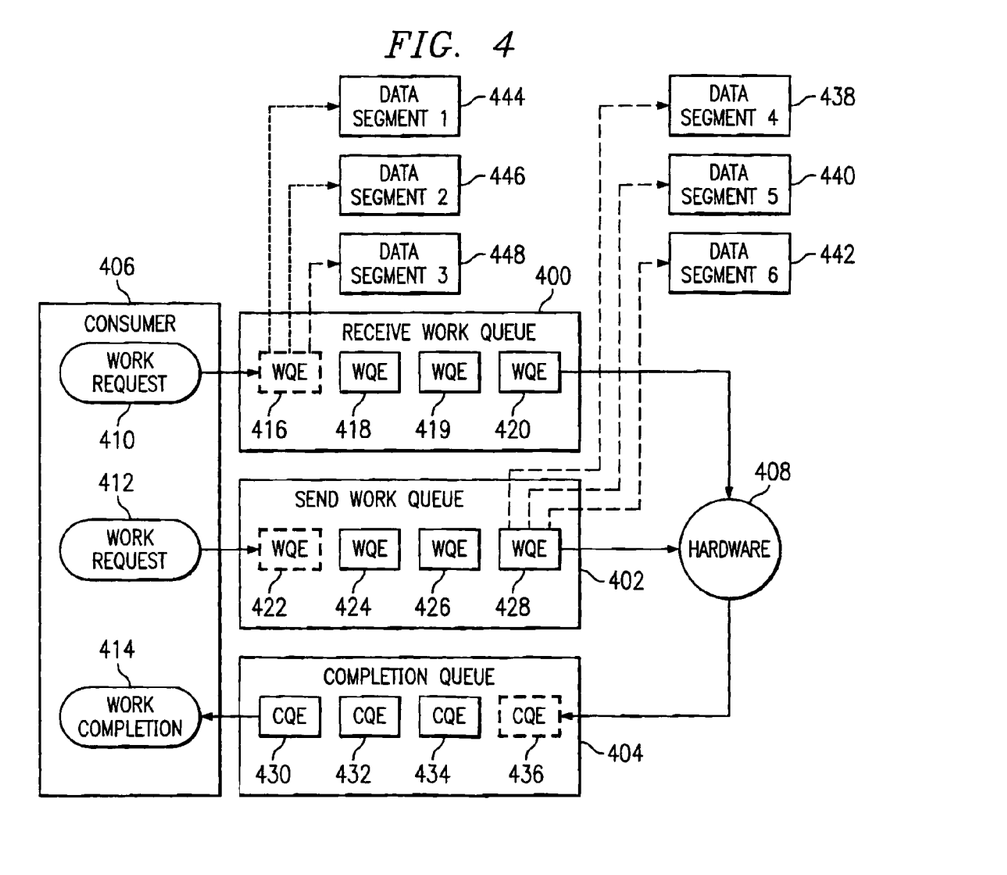
FIG. 4 is a diagram illustrating processing of work requests in accordance with a preferred embodiment of the present invention.

FIG. 4 is a diagram illustrating processing of work requests in accordance with a preferred embodiment of the present invention. In FIG. 4, a receive work queue 400, send work queue 402, and completion queue 404 are present for processing requests from and for consumer 406. These requests from consumer 402 are eventually sent to hardware 408. In this example, consumer 406 generates work requests 410 and 412 and receives work completion 414. As shown in FIG. 4, work requests placed onto a work queue are referred to as work queue elements (WQEs).

Send work queue 402 contains work queue elements (WQEs) 422–428, describing data to be transmitted on the SAN fabric. Receive work queue 400 contains work queue elements (WQEs) 416–420, describing where to place incoming channel semantic data from the SAN fabric. A work queue element is processed by hardware 408 in the host channel adapter.

The verbs also provide a mechanism for retrieving completed work from completion queue 404. As shown in FIG. 4, completion queue 404 contains completion queue elements (CQEs) 430–436. Completion queue elements contain information about previously completed work queue elements. Completion queue 404 is used to create a single point of completion notification for multiple queue pairs. A completion queue element is a data structure on a completion queue. This element describes a completed work queue element. The completion queue element contains sufficient information to determine the queue pair and specific work queue element that completed. A completion queue context is a block of information that contains pointers to, length, and other information needed to manage the individual completion queues.

Example work requests supported for the send work queue 402 shown in FIG. 4 are as follows. A send work request is a channel semantic operation to push a set of local data segments to the data segments referenced by a remote node's receive work queue element. For example, work queue element 428 contains references to data segment 4 438, data segment 5 440, and data segment 6 442. Each of the send work request's data segments contains part of a virtually contiguous memory region. The virtual addresses used to reference the local data segments are in the address context of the process that created the local queue pair.

A remote direct memory access (RDMA) read work request provides a memory semantic operation to read a virtually contiguous memory space on a remote node. A memory space can either be a portion of a memory region or portion of a memory window. A memory region references a previously registered set of virtually contiguous memory addresses defined by a virtual address and length. A memory window references a set of virtually contiguous memory addresses that have been bound to a previously registered region.

The RDMA Read work request reads a virtually contiguous memory space on a remote endnode and writes the data to a virtually contiguous local memory space. Similar to the send work request, virtual addresses used by the RDMA Read work queue element to reference the local data segments are in the address context of the process that created the local queue pair. The remote virtual addresses are in the address context of the process owning the remote queue pair targeted by the RDMA Read work queue element.

A RDMA Write work queue element provides a memory semantic operation to write a virtually contiguous memory space on a remote node. The RDMA Write work queue element contains a scatter list of local virtually contiguous memory spaces and the virtual address of the remote memory space into which the local memory spaces are written.

A RDMA FetchOp work queue element provides a memory semantic operation to perform an atomic operation on a remote word. The RDMA FetchOp work queue element is a combined RDMA Read, Modify, and RDMA Write operation. The RDMA FetchOp work queue element can support several read-modify-write operations, such as Compare and Swap if equal.

A bind (unbind) remote access key (R_Key) work queue element provides a command to the host channel adapter hardware to modify (destroy) a memory window by associating (disassociating) the memory window to a memory region. The R_Key is part of each RDMA access and is used to validate that the remote process has permitted access to the buffer.

In one embodiment, receive work queue 400 shown in FIG. 4 only supports one type of work queue element, which is referred to as a receive work queue element. The receive work queue element provides a channel semantic operation describing a local memory space into which incoming send messages are written. The receive work queue element includes a scatter list describing several virtually contiguous memory spaces. For example, work queue element 416 in receive work queue 400 references data segment 1 444, data segment 2 446, and data segment 3 448. An incoming send message is written to these memory spaces. The virtual addresses are in the address context of the process that created the local queue pair.

For interprocessor communications, a user-mode software process transfers data through queue pairs directly from where the buffer resides in memory. In one embodiment, the transfer through the queue pairs bypasses the operating system and consumes few host instruction cycles. Queue pairs permit zero processor-copy data transfer with no operating system kernel involvement. The zero processor-copy data transfer provides for efficient support of high-bandwidth and low-latency communication.

When a queue pair is created, the queue pair is set to provide a selected type of transport service. In one embodiment, a distributed computer system implementing the present invention supports four types of transport services: reliable, unreliable, reliable datagram, and unreliable datagram connection service.

Reliable and Unreliable connected services associate a local queue pair with one and only one remote queue pair. Connected services require a process to create a queue pair for each process that is to communicate with over the SAN fabric. Thus, if each of N host processor nodes contain P processes, and all P processes on each node wish to communicate with all the processes on all the other nodes, each host processor node requires $P^2 \times (N-1)$ queue pairs. Moreover, a process can connect a queue pair to another queue pair on the same host channel adapter.

Figure 5:
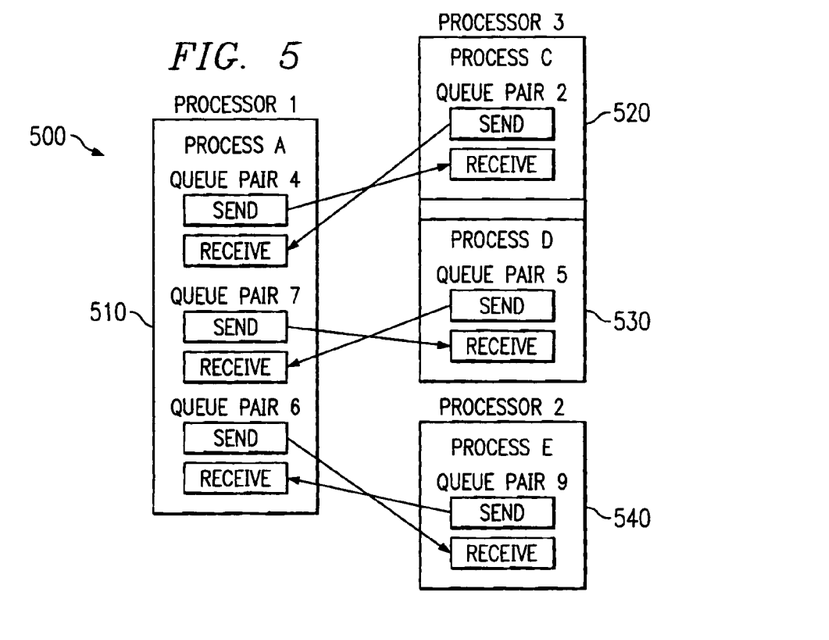
FIG. 5 is a diagram illustrating a portion of a distributed computer system in accordance with a preferred embodiment of the present invention in which a reliable connection service is used.

FIG. 5 is a diagram illustrating a portion of a distributed computer system in accordance with a preferred embodiment of the present invention in which a reliable connection service is used. The distributed computer system 500 in FIG. 5 includes a host processor node 1, a host processor node 2, and a host processor node 3. Host processor node 1 includes a process A 510. Host processor node 3 includes a process C 520 and a process D 530. Host processor node 2 includes a process E 540.

Host processor node 1 includes queue pairs 4, 6 and 7, each having a send work queue and receive work queue. Host processor node 2 has a queue pair 9 and host processor node 3 has queue pairs 2 and 5. The reliable connection service of distributed computer system 500 associates a local queue pair with one an only one remote queue pair. Thus, the queue pair 4 is used to communicate with queue pair 2; queue pair 7 is used to communicate with queue pair 5; and queue pair 6 is used to communicate with queue pair 9.

A WQE placed on one send queue in a reliable connection service causes data to be written into the receive memory space referenced by a Receive WQE of the connected queue pair. RDMA operations operate on the address space of the connected queue pair.

In one embodiment of the present invention, the reliable connection service is made reliable because hardware maintains sequence numbers and acknowledges all packet transfers. A combination of hardware and SAN driver software retries any failed communications. The process client of the queue pair obtains reliable communications even in the presence of bit errors, receive underruns, and network congestion. If alternative paths exist in the SAN fabric, reliable communications can be maintained even in the presence of failures of fabric switches, links, or channel adapter ports.

In addition, acknowledgments may be employed to deliver data reliably across the SAN fabric. The acknowledgement may, or may not, be a process level acknowledgement, i.e. an acknowledgement that validates that a receiving process has consumed the data. Alternatively, the acknowledgement may be one that only indicates that the data has reached its destination.

Reliable datagram service associates a local end-to-end (EE) context with one and only one remote end-to-end context. The reliable datagram service permits a client process of one queue pair to communicate with any other queue pair on any other remote node. At a receive work queue, the reliable datagram service permits incoming messages from any send work queue on any other remote node.

The reliable datagram service greatly improves scalability because the reliable datagram service is connectionless. Therefore, an endnode with a fixed number of queue pairs can communicate with far more processes and endnodes with a reliable datagram service than with a reliable connection transport service. For example, if each of N host processor nodes contain P processes, and all P processes on each node wish to communicate with all the processes on all the other nodes, the reliable connection service requires $P^2 \times (N-1)$ queue pairs on each node. By comparison, the connectionless reliable datagram service only requires P queue pairs+(N-1) EE contexts on each node for exactly the same communications.

Figure 6:
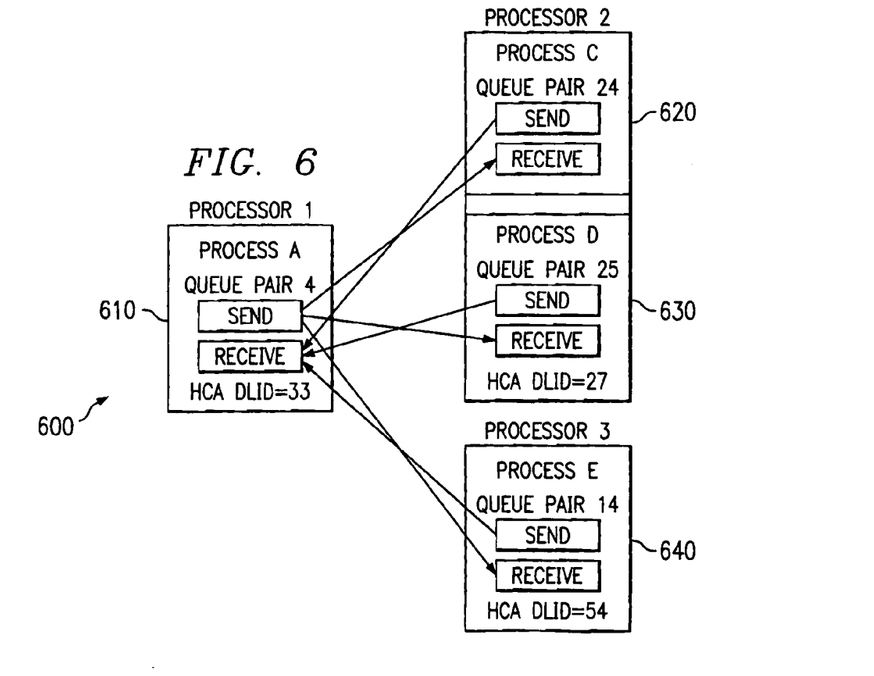
FIG. 6 is a diagram illustrating a portion of a distributed computer system in accordance with a preferred embodiment of the present invention in which reliable datagram service connections are used.

FIG. 6 is a diagram illustrating a portion of a distributed computer system in accordance with a preferred embodiment of the present invention in which reliable datagram service connections are used. The distributed computer system 600 in FIG. 6 includes a host processor node 1, a host processor node 2, and a host processor node 3. Host processor node 1 includes a process A 610 having a queue pair 4. Host processor node 2 has a process C 620 having a queue pair 24 and a process D 630 having a queue pair 25. Host processor node 3 has a process E 640 having a queue pair 14.

In the reliable datagram service implemented in the distributed computer system 600, the queue pairs are coupled in what is referred to as a connectionless transport service. For example, a reliable datagram service couples queue pair 4 to queue pairs 24, 25 and 14. Specifically, a reliable datagram service allows queue pair 4's send work queue to reliably transfer messages to receive work queues in queue pairs 24, 25 and 14. Similarly, the send queues of queue pairs 24, 25, and 14 can reliably transfer messages to the receive work queue in queue pair 4.

In one embodiment of the present invention, the reliable datagram service employs sequence numbers and acknowledgments associated with each message frame to ensure the same degree of reliability as the reliable connection service. End-to-end (EE) contexts maintain end-to-end specific state to keep track of sequence numbers, acknowledgments, and time-out values. The end-to-end state held in the EE contexts is shared by all the connectionless queue pairs communication between a pair of endnodes. Each endnode requires at least one EE context for every endnode it wishes to communicate with in the reliable datagram service (e.g., a given endnode requires at least N EE contexts to be able to have reliable datagram service with N other endnodes).

The unreliable datagram service is connectionless. The unreliable datagram service is employed by management applications to discover and integrate new switches, routers, and endnodes into a given distributed computer system. The unreliable datagram service does not provide the reliability guarantees of the reliable connection service and the reliable datagram service. The unreliable datagram service accordingly operates with less state information maintained at each endnode.

Figure 7:
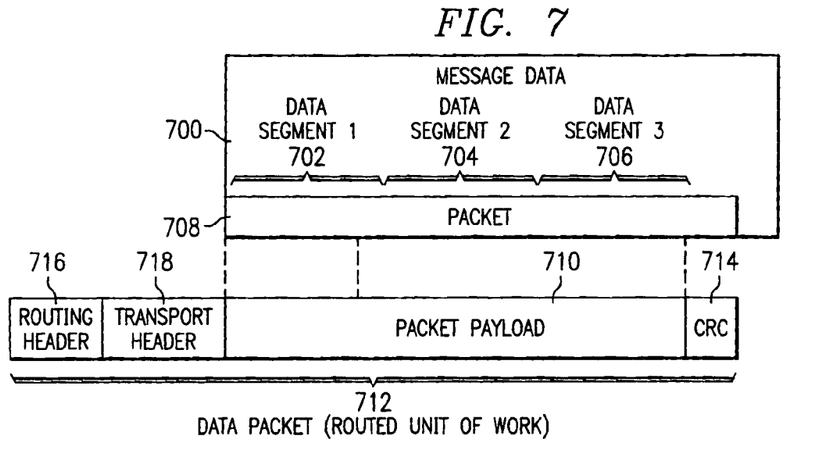
FIG. 7 is an illustration of a data packet in accordance with a preferred embodiment of the present invention.

FIG. 7 is an illustration of a data packet in accordance with a preferred embodiment of the present invention. A data packet is a unit of information that is routed through the SAN fabric. The data packet is an endnode-to-endnode construct, and is thus created and consumed by endnodes. For packets destined to a channel adapter (either host or target), the data packets are neither generated nor consumed by the switches and routers in the SAN fabric. Instead for data packets that are destined to a channel adapter, switches and routers simply move request packets or acknowledgment packets closer to the ultimate destination, modifying the variant link header fields in the process. Routers, also modify the packet's network header when the packet crosses a subnet boundary. In traversing a subnet, a single packet stays on a single service level.

Message data 700 contains data segment 1 702, data segment 2 704, and data segment 3 706, which are similar to the data segments illustrated in FIG. 4. In this example, these data segments form a packet 708, which is placed into packet payload 710 within data packet 712. Additionally, data packet 712 contains CRC 714, which is used for error checking. Additionally, routing header 716 and transport header 718 are present in data packet 712. Routing header 716 is used to identify source and destination ports for data packet 712. Transport header 718 in this example specifies the destination queue pair for data packet 712. Additionally, transport header 718 also provides information such as the operation code, packet sequence number, and partition for data packet 712.

The operating code identifies whether the packet is the first, last, intermediate, or only packet of a message. The operation code also specifies whether the operation is a send RDMA write, read, or atomic. The packet sequence number is initialized when communication is established and increments each time a queue pair creates a new packet. Ports of an endnode may be configured to be members of one or more possibly overlapping sets called partitions.

Figure 8:
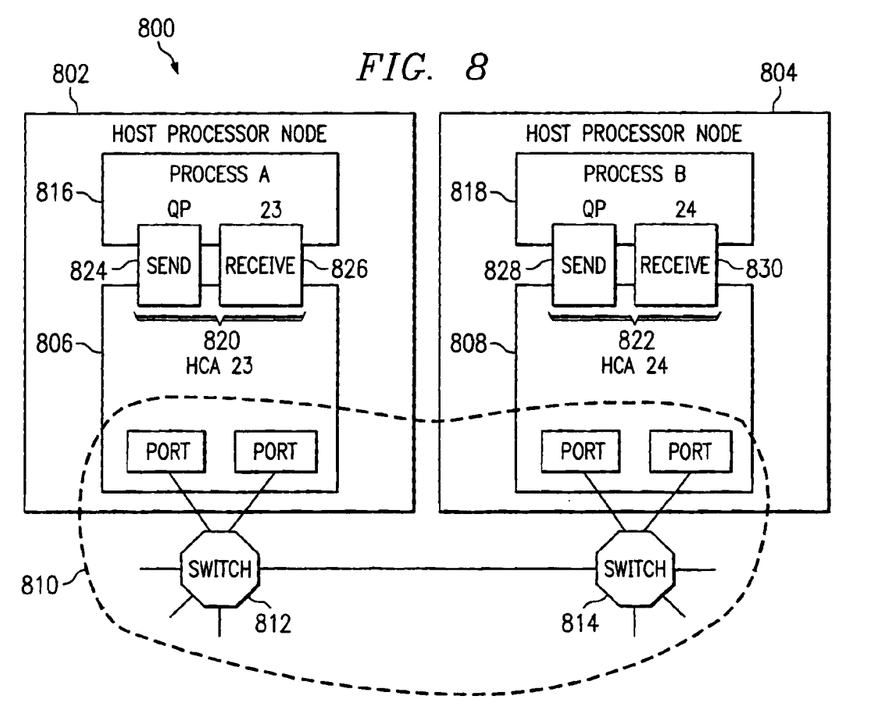
FIG. 8 is a diagram illustrating a portion of a distributed computer system in accordance with a preferred embodiment of the present invention.

FIG. 8 is a diagram illustrating a portion of a distributed computer system in accordance with a preferred embodiment of the present invention. The distributed computer system 800 in FIG. 8 includes a host processor node 802 and a host processor node 804. Host processor node 802 includes a host channel adapter 806. Host processor node 804 includes a host channel adapter 808. The distributed computer system in FIG. 8 includes a SAN fabric 810, which includes a switch 812 and a switch 814. The SAN fabric includes a link coupling host channel adapter 806 to switch 812; a link coupling switch 812 to switch 814; and a link coupling host channel adapter 808 to switch 814.

In the example transactions, host processor node 802 includes a client process A. Host processor node 804 includes a client process B. Client process A interacts with host channel adapter hardware 806 through queue pair 23. Client process B interacts with hardware channel adapter hardware 808 through queue pair 24. Queue pairs 23 and 24 are data structures that include a send work queue and a receive work queue. Queue pairs 23 and 24 are unreliable datagram General Service Interface (GSI) queue pairs. GSI queue pairs are used for management including the connection establishment process.

Process A initiates a connection establishment message request by posting work queue elements to the send queue of queue pair 23. Such a work queue element is illustrated in FIG. 4. The message request of client process A is referenced by a gather list contained in the send work queue element. Each data segment in the gather list points to part of a virtually contiguous local memory region, which contains a connection management request message, such as indicated by data segments 1, 2, and 3, which respectively hold message parts 1, 2, and 3, in FIG. 4. This message is used to request a connection between host channel adapters 806 and 808.

Each process residing in host processor node 804 communicates to process B a ServiceID which is associated to each specific process. Process B will compare the Service ID of incoming request messages to the ServiceID associated with each process.

As stated above, the present invention provides a mechanism for establishing multiple connections using a private data field of a communication management protocol. With the present invention, a Service ID identifies a specific consumer and the private data field contains a list of connection attributes for each connection that is to be established. An active side requests a connection and the passive side replies to the connection request. The active side sends the passive side a connection establishment request. This connection establishment request includes a Service ID which identifies a passive side process associated with a service. This connection establishment request also includes communication attributes of one or more connected services and datagram services associated with the Service ID. The passive side passes the connection request to a process associated with the service. If the passive side process does not wish to carry out the service, a negative reply message is returned to the active side. If the passive side process does wish to carry out the service, a positive reply is returned to the active side and the reply includes the communication attributes for the connection and unreliable services associated with the Service ID used in the connection establishment request.

Figure 9:
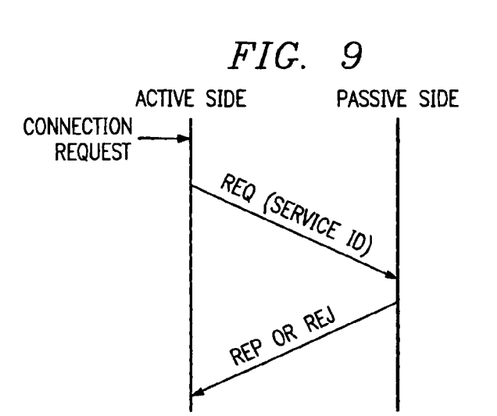
FIG. 9 is a diagram showing a flow of a service being identified during a connection establishment in a preferred embodiment of the present invention.

FIG. 9 is a diagram showing a flow of a service being identified during a connection establishment in a preferred embodiment of the present invention. Similar to all other unreliable datagram messages, the request message sent by process A is a single packet message. Host channel adapter 808 in FIG. 8 sends the request message contained in the work queue element posted to queue pair 24. The request message contained in the work queue element posted to queue pair 23. The request message is destined for host channel adapter 806 in FIG. 8, queue pair 24 and contains a Service ID field. The Service ID field is used by a final destination endnode to determine which consumer is associated with the Service ID. The request message is placed in a next available receive work queue element from a receive queue of queue pair 24 in host channel adapter 806.

Process B uses a poll of a completion queue and retrieves a completed receive work queue element from the receive queue of queue pair 24 in host channel adapter 806. The completed receive work queue completion element contains the request message sent by process A. Process B then compares the Service ID of the request message to the Service ID of each process that has registered itself with process B. If a match occurs, process B passes the request message to a matching process. Otherwise, if a match does not occur, the request message is rejected and process B sends process A a rejection message.

If the consumer accepts the message, the consumer informs process B that a connection establishment REQ has been accepted. Process B responds to the connection establishment REQ by posting send work queue elements to a send queue of queue pair 24. Such a work queue element is illustrated in FIG. 4. The message response of client process B is referenced by a gather list contained in the send work queue element. Each of the data segments in the gather list point to a virtually contiguous local memory region which contains a Connection Management reject message. This reject message is used to reject the connection establishment REQ.

A REP message sent by process B is a single packet message. Host channel adapter 808 sends the REP message contained in the work queue element posted to queue pair 24. The REP message is destined for host channel adapter 806, queue pair 23 and contains acceptance of the previous REQ. The acceptance confirms that a process in host channel adapter 808 is associated with the Service ID sent in the REQ message and informs process A which queue pair to use to communicate with the process associated with the Service ID. Upon a successful arrival at host channel adapter 806, the REQ message is placed in the next available receive work queue element from the receive queue pair 23 in host channel adapter 806. Process A polls a completion queue and retrieves a completed receive work queue element from the receive queue of queue pair 23 in host channel adapter 806. The completed receive work queue element contains the REP message sent by process B. Process A determines that the Service ID is valid, the queue pair being used to reach the Service ID and that the connection was accepted. Process A proceeds with the remainder of the connection establishment protocol. Packets referenced above may be routed within a subnet by switches or between subnets by routers. The present invention supports both cases.

Figure 10:
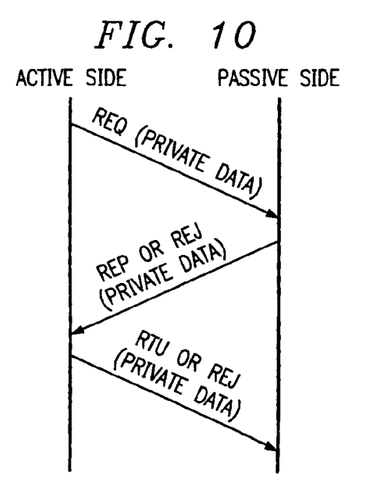
FIG. 10 is a diagram showing a flow of Communication Management packets to establish a connection and exchange private data in a preferred embodiment of the present invention.

FIG. 10 illustrates how during a connection establishment process, an adapter uses a connection management protocol REQ request message to request establishment of one or more connections. A Service ID is registered with a Subnet Administrator by a passive side. An active and passive side share a common policy for interpreting a Service ID. The Service ID is used to establish a single connection. In the present invention, a Service ID is also used to establish a group of communications through the use of a Communication Management private data field or a Communication Group with predefined setting for each communication in the group.

As shown in FIG. 10, during the connection establishment process, the active side uses the Service ID and private data fields of the Connection Management protocol (REQ) request message to establish one or more connections. A private data field is used to establish either multiple connections and multiple service resolutions, or to identify a communication group and establish communications necessary to support the communication group. To establish multiple connections, the private data contains a list of communications to be established, along with attributes of each communication. In one embodiment of the present invention, the list of communications may include: number of communications to be established, lease period for all communications and attributes of each communication which may include: lease period for a communication, communication type (e.g., RC, RD, UD, UC), QP Number, local End-End Context Number, remote EECN, Q-Key, Initiator depth, end-end flow control, starting Packet Sequence Number, retry count, P-Key, Path Maximum Transmission Unit, if a Reliable Datagram Channel exists, and a Resource Not Ready retry count. Primary port attributes may include: local ID, remote ID, local GID, remote GID, flow label, packet rate, traffic class, hop limit, Service Level, subnet local and local acknowledge timeout. For dual ported channel adapters with multipath support, alternate port attributes may include: using the same attributes as the primary port. This may be used to provide two paths to the port, in case one path becomes non-operational, the other can be used. Alternate port attributes may also include a local ID, a remote ID, a local GID, a remote GID, flow label, packet rate, traffic class, hop limit, SL, subnet local and local acknowledge timeout.

Figure 11A:
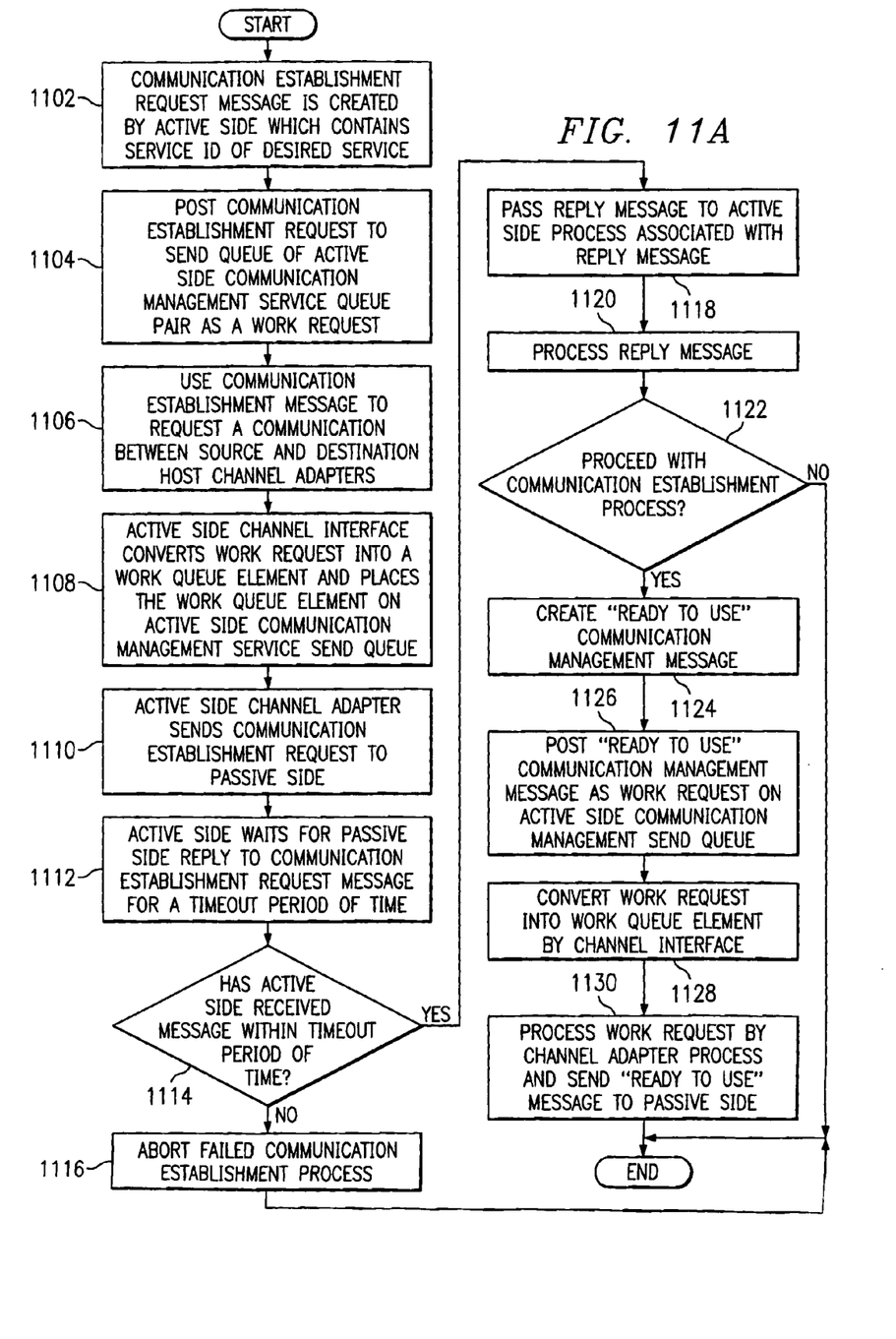
FIGS. 11A and 11B are flowcharts illustrating simultaneously establishing multiple connections and service resolutions in accordance with a preferred embodiment of the present invention.
Figure 11B:
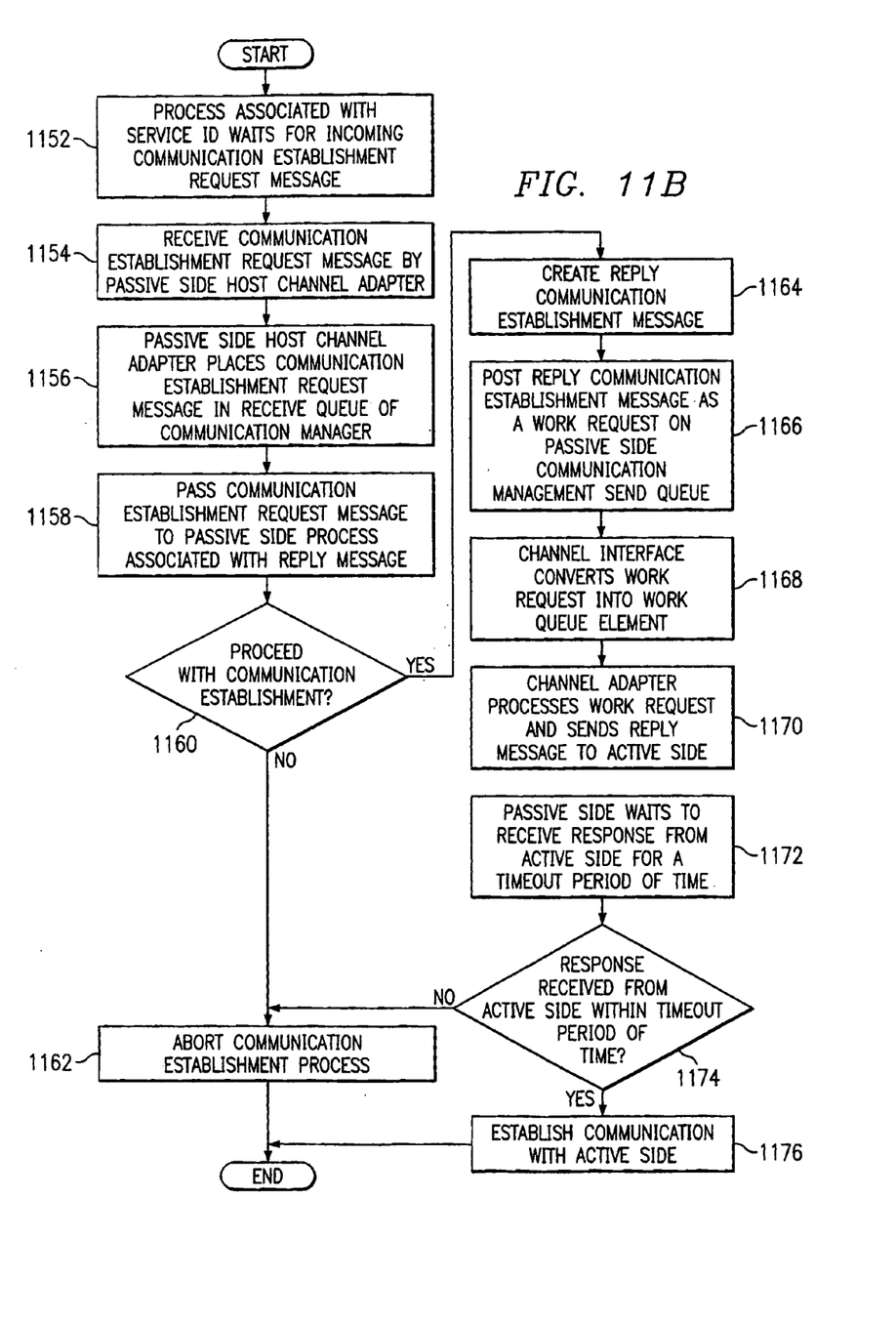

FIGS. 11A and 11B are flowcharts illustrating simultaneously establishing multiple connections and service resolutions in accordance with a preferred embodiment of the present invention. FIG. 11A shows an active side process and FIG. 11B shows a passive side process.

In FIG. 11A, the operation starts with the active side process creating a communication establishment REQuest message which contains the Service ID of the desired service (step 1102). This communication establishment request message is similar to a standard connection establishment REQuest message, except private data contains communication attributes for each desired unreliable datagram service resolution(s) and/or connection(s). In one embodiment, the message is called a communication (i.e. not a connection) establishment message because in addition to being used to establish one or more connections, the message can also be used to resolve unreliable datagram queue pair number(s) used by a given Service ID. The communication establishment request is posted to a send queue of the active side communication management service queue pair as a work request (step 1104). The work request contains a gather list which contains pointers to the connection establishment REQuest message. The communication establishment message is used in a communication management request message to request a communication between source and destination host channel adapters (step 1106). An active side channel interface converts the work request into a work queue element and places the work queue element on an active side communication management service send queue (step 1108). An active side channel adapter sends the communication establishment REQuest to the passive side (step 1110). At this point, the active side process waits for the passive side to REPly to the communication establishment REQuest message for a timeout period of time (step 1112).

Then a determination is made as to whether or not the active side has received the REPly message within the timeout period of time (step 1114). If the REPly message is received on the active side's communication management receive queue within the timeout period of time (step 1114:YES), the REPly message will be passed to the active side process associated with the REPly message (step 1118). The process REPly message will then be processed (step 1120). If the REPly message is not received on the active side's communication management receive queue within the timeout period of time (step 1114:NO), the failed communication establishment process is aborted (step 1116), and thereafter the operation terminates.

Once the REPly message is processed in step 1120, a determination is made as to whether or not to proceed with the communication establishment process (step 1122). If the communication establishment process is not to be continued (step 1122:NO), the operation terminates. If the communication establishment process is to be continued (step 1122: YES), then a "ready to use" communication management communication message is created (step 1124). The "ready to use" communication management message is posted as a work request on an active side communication management send queue (step 1126). A channel interface converts the work request into a work queue element (step 1128). A channel adapter processes the work request and sends the "ready to use" message to the passive side (step 1130) and thereafter the operation terminates. At this point the communication establishment process is complete and the communications are operational.

In FIG. 11B, the operation starts by a process associated with the Service ID referenced above waiting for incoming communication establishment REQuest messages (step 1152). The passive side host channel adapter receives a communication establishment message from an active side host channel adapter (step 1154). The passive side host channel adapter places the communication establishment request in a receive queue of a communication manager (step 1156). Once received, the communication establishment REQuest message is passed to the passive side process associated with the REPly message (step 1158). Then a determination is made as to whether or not to proceed with the communication establishment process (step 1160). If the passive side wishes to proceed with the communication establishment process (step 1160:YES), a REPly communication establishment message will be created (step 1164) and posted as a work request on the passive side's communication management send queue (step 1166). If the passive side does not want to proceed with the communication establishment process (step 1160:NO), the communication establishment process is aborted (step 1162) and thereafter the operation terminates.

Returning to step 1166, once a reply communication establishment message is posted as a work request on the passive side's communication management send queue, a channel interface converts the work request into a work queue element (step 1168). A channel adapter processes the work queue element and sends a REPly message to the active side (step 1170). The passive side then waits to receive a response from the active side within a timeout period of time (step 1172). A determination is then made as to whether or not the passive side has received a response from the active side within the timeout period of time (step 1174). If the passive side has not received a response to the REPly message from the active side within the timeout period of time (step 1174:NO), the communication establishment process is aborted (step 1162) and thereafter the operation terminates. A response to the REPly message can take two forms: a Ready To Use message; or a message on at least one of the established connections.

Returning to step 1174, if a response is received from the active side within the timeout period of time (step 1174:YES), a communication is established with the active side (step 1176) and thereafter the operation terminates.

It is important to realize that a number of optimizations may be employed to enhance the operation of the present invention as described in embodiment herein described. One such optimization is to reduce the number of confirmatory response messages sent from the adapter to the host by, for instance, limiting the number of responses to one per a given number of transfers. Another is to avoid placing some or all of the completion queue elements on a completion queue.

To establish multiple communications through a Service ID associated with a communications group, private data contains a name of the communication group and attributes of the communication group as depicted in Table I. To support a communication group policy, the passive side may:

a) Define the number of queue pairs (with service type for each) and the number of other adapter resources assigned to a given communication group.

b) Use a managed or unmanaged approach to define the resources which are to be associated with a communication group during communication establishment.

i) Under a managed approach the resources which are to be associated with a communication group (see Table I) are preset either through a resource management queue pair or during the manufacturing process. The resource management queue pair sends a communication group matrix to the adapter and the communication management ServiceID associated to the communication group. If the adapter resources are over provisioned, the adapter returns an over provisioning error response. If no error is encountered, the adapter accepts the communication group defined by the matrix. The adapter can retain the communication group in non-volatile-store or require that it be recreated every time the machine is booted. An adapter can support multiple communication groups, each is identified by a different communication management ServiceID. During the communication establishment process, the active side uses the communication management ServiceID to select one of the preset communication groups supported by the adapter.

ii) Under an unmanaged approach the resources that are to be associated with a communication group (see Table V) are dynamically negotiated through the communication management protocol shown in FIG. 12. The private data would consist of the contents from Table V, plus the additional Communication Management fields needed for each connection or unreliable datagram service (e.g. Primary Local Port LID).

TABLE I

Communication Group Adapter Resource Allocation Mechanism
Resources allocated to the communication group

| Service Levels | Queue Pairs and Type | Send Queue Depth | Receive Queue Depth | Read Cache Size | Fast Write Buffer Size | Other Adapter Resources |
|---|---|---|---|---|---|---|
| 1 | 1, RC | 1200 | 1200 | 400 MB | 400 MB | ... |
| 2 | 1, RC | 600 | 600 | 400 MB | 400 MB | ... |
| 3 | 1, UD | 200 | 200 | 100 MB | 100 MB | ... |

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. For example, although the illustrations show communications from one node to another node, the mechanisms of the present invention may be implemented between different processes on the same node. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, operable in a data processing system connected to a System Area Network (SAN) and having a plurality of processes, for performing communication management, comprising the steps of:

sending a communication management request from a first process within said plurality of processes to a second process within said plurality of processes, wherein said communication management request is sent via channel adapters that are part of said SAN, wherein a private data field contains communication attributes for a plurality of communication connections and unreliable datagram resolutions;

receiving a reply to said communication establishment request; and responsive to said second process allowing said communication management request, initiating, under control of said channel adapters, multiple communication connections and unreliable datagram resolutions.

2. The method as recited in claim 1, wherein said first process is an active side of the process.

3. The method as recited in claim 1, wherein said second process is a passive side of the process.

4. The method as recited in claim 1, wherein said channel adapters comprise host channel adapters and target channel adapters.

5. The method as recited in claim 1, further comprising:
determining that said first process within said plurality of processes has received a reply from said second process within a specified period of time;
passing said reply to said first process; and
processing said reply message.

6. The method as recited in claim 1, further comprising:
determining tat said first process has not received said reply from said second process within a specified period of time; and
aborting a multiple connections and unreliable datagram resolutions communication establishment process.

7. The method as recited in claim 5, further comprising:
responsive to maid reply being received by said first process, creating a communication management message; and
posting said communication management message as a work request on a communication management send queue associated with said first process.

8. The method as recited in claim 7, wherein said communication management message is a "ready to use" communication management message.

9. The method as recited in claim 7, further comprising:
converting, by a channel interface, said work request into a work queue element;
processing, by one of said channel adapters, said work request; and
sending said communication management message to said second process.

10. A method, operable in a data processing system connected to a System Area Network (SAN) and having a plurality of processes, for establishing multiple connections, said method comprising the steps of:

sending a connection establishment request from a first process within said plurality of processes to a second process within said plurality of processes, wherein said connection establishment request is sent via channel adapters that are part of SAN, wherein a private data field contains a connection indicator;

receiving a reply to said connection establishment request; and responsive to said second process approving said request, establishing multiple communication connections between said first process and said second process.

11. The method as recited in claim 10, further comprising:
placing said communication establishment request in a receive queue of a communication manager associated with said second process; and
passing said communication establishment request to said second process.

12. The method as recited in claim 10, further comprising:
posting a reply to said communication establishment request as a work request on a communication management send queue associated with said second process; and
converting said work request into a work queue element by a channel interface.

13. The method of claim 10, wherein said multiple connections are considered established when said second process receives one of a message from at least one established connection and a "ready to use" message.

14. A system, comprising:
a system area network (SAN);
a communications unit connected to said SAN and containing channel adapters that are part of said SAN;
a memory, including a set of instructions, connected to said SAN; and
a processing unit connected to said SAN, wherein said processing unit includes at least one processor, wherein said processing unit executes said set of instructions to send a communication management request, via said communications unit, from a first process within a plurality of processes to a second process within said plurality of processes, wherein a private data field contains communication attributes for a plurality of communication connections and unreliable datagram resolutions; and
responsive to said second process allowing said communication management request, initiates, under control of said channel adapters, multiple communication connections and unreliable datagram resolutions.

15. A system, comprising:
a system area network (SAN);
a communications unit connected to said SAN and containing channel adapters that are part of said SAN;
a memory, including a set of instructions, connected to said SAN; and
a processing unit connected to said bus system, wherein said processing unit includes at least one processor, wherein said processing unit executes said set of instructions to send a connection establishment request, via said communications unit, from a first process within a plurality of processes to a second process within said plurality of processes, wherein said connection establishment request is sent via said communications unit, wherein a private data field contains a connection indicator, and responsive to said second process accepting said connection establishment request from said first process, establishes multiple communication connections between said first process and said second process.

16. A system, operable in a data processing system connected to a System Area Network (SAN and having a plurality of processes, for performing a communication connection, comprising:

sending means for sending a communication management request, containing multiple requests for connections or unreliable datagram resolutions, from a first process within said plurality of processes to a second process within said plurality of processes, wherein said communication management request is sent via channel adapters that are part of said SAN, wherein a private data field contains communication attributes for a plurality of communication connections and unreliable datagram resolutions; and initiating means, responsive to said second process allowing said communication management request, for initiating, under control of said adapter, multiple communication connections and unreliable datagram resolutions.

17. A system, operable in a data processing system connected to a System Area Network (SAN) and having a plurality of processes, for performing a plurality of communication connections, comprising:

receiving means for receiving a connection establishment request from a first process within said plurality of processes to a second process within said plurality of processes wherein said connection establishment request is sent via channel adapters that are part of said SAN, wherein a private data field contains a connection indicator;

sending means for sending a reply communication establishment message, under control of said channel adapters, to said first process; and establishing means, responsive to said second process receiving said communication establishment message from said first process, for establishing multiple communication connections between said first process and said second process.

18. A computer program product in a computer-readable medium for performing a communication connection within a System Area Network (SAN) comprising:

instructions for sending a communication management request from a first process within a plurality of processes to a second process within said plurality of processes, wherein said communication management request is sent via channel adapters that are part of said SAN, connections and unreliable datagram resolutions; and instructions, responsive to said second process allowing said communication management request, for initiating, under control of said adapter channel adapters, multiple communication connections and unreliable datagram resolutions.

19. A computer program product in a computer-readable medium for performing multiple communication connections within a System Area network (SAN), comprising;

instructions for sending a connection establishment request from a first process within a plurality of processes to a second process within said plurality of processes wherein said connection establishment request is sent via channel adapters that are part of said SAN, wherein a private data field contains a connection indicator; end instructions, responsive to said second process accepting said connection establishment request from said first process, for establishing multiple communication connections between said first process and said second process.

20. The method of claim 10, wherein said connection indicator contains communication attributes for a plurality of connections.

21. The method of claim 10, wherein said connection indicator contains a name of a connection group.

22. The computer program product of claim 17, wherein said connection indicator contains a name of a connection group.

* * * * *